April 3, 1956  N. A. PALMGREN  2,740,675
ROLLER BEARING WITH FREE GUIDE RING
Filed Aug. 6, 1953

INVENTOR
NILS ARVID PALMGREN
BY HIS ATTORNEYS
Howson & Howson

United States Patent Office 2,740,675
Patented Apr. 3, 1956

2,740,675

ROLLER BEARING WITH FREE GUIDE RING

Nils Arvid Palmgren, Goteborg, Sweden, assignor, by mesne assignments, to SKF Industries, Inc., Philadelphia, Pa., a corporation of Delaware Application August 6, 1953, Serial No. 372,682

Claims priority, application Sweden May 10, 1948

5 Claims. (Cl. 308—212)

The type of roller bearing which is known as the double row spherical roller bearing has been the object of developments in design during several decades. The forms of the bearing which have hitherto been developed have been very well suited for a great number of bearing applications. There has, however, been a continuous endeavor to further increase the carrying capacity and to decrease the cost of manufacture by refinement in design. It has, however, been impossible to attain the desired result without at the same time increasing the friction in the bearing. As examples of this may be mentioned the attempts to abandon roller guidance from fixed flanges in favor of guiding the roller by the cage alone or by means of a loose guiding ring or by both of these elements together. These means usually result in some increase in load carrying capacity and reduced costs, but have also without exception resulted in bearings in which the frictional losses have been considerably increased. The bearings thus produced have a limited field of use and are not suitable for high speeds.

Figure 1:
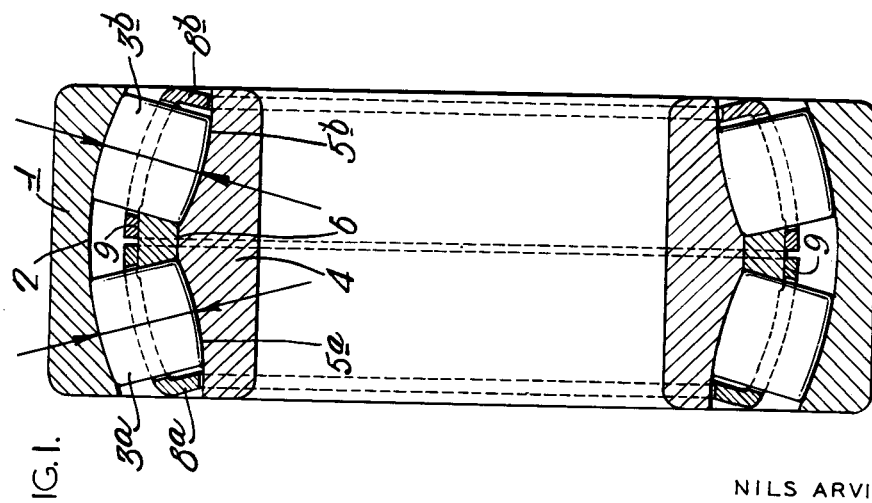

The type of bearing which appears most promising is that described in and illustrated in Figure 1 of United States Patent 1,350,263. Although this design has thus been known for thirty years it has not been put to successful use in practice. The reason for this is that the loose guide ring can guide the rollers with sufficient accuracy only if it is in its turn accurately guided.

The present invention relates to a solution of the problem of the loose guide ring by which the spherical roller bearing attains maximum load carrying capacity at a minimum of cost without unduly increasing the friction in the bearing. It is characterized by the fact that the guide ring, which at the same time is axially displaceable and radially guided on a cylindrical surface disposed on the inner race ring between the races, is dimensioned to conform closely in axial width to the space which exists between the rows of rollers when the latter are in the positions of axial equilibrium which they assume when not subjected to forces from any bearing part other than the races, as hereinafter more fully set forth.

Figure 2:
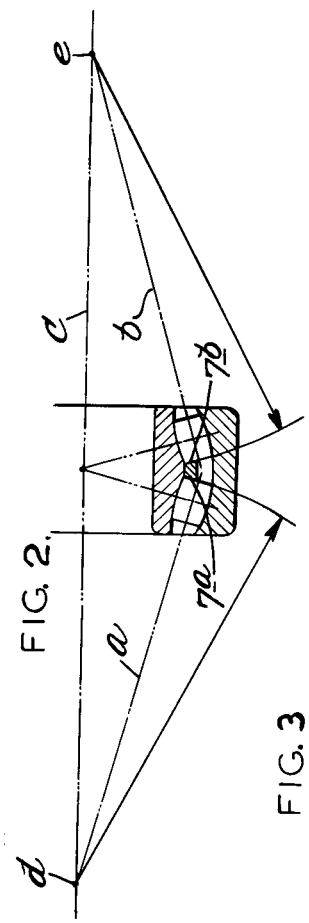
Figure 3:
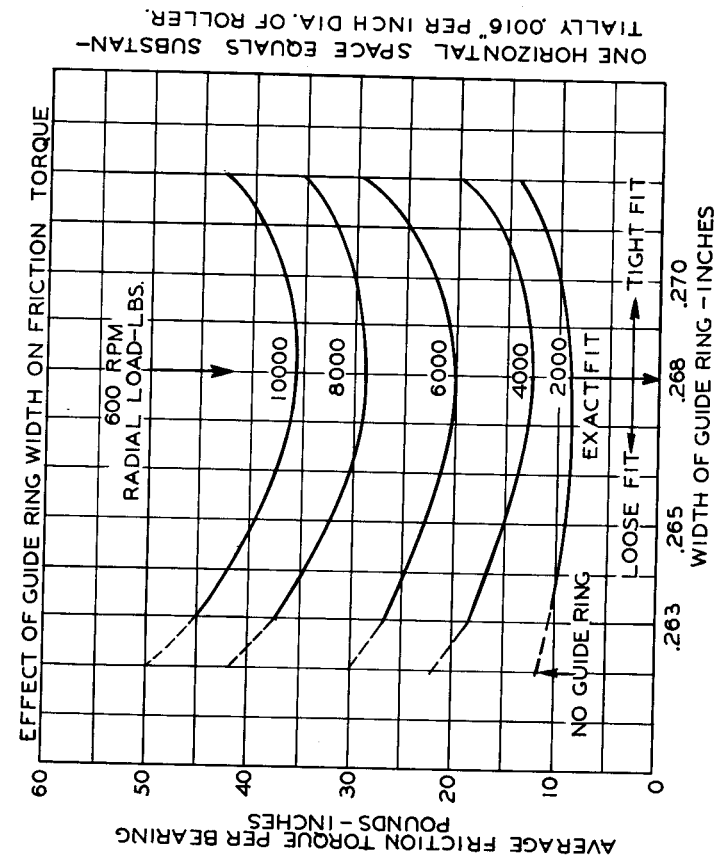

The invention is illustrated on the accompanying drawing in which Figure 1 is a sectional view in an axial plan of a roller bearing according to the invention;

Figure 2 is a diagrammatic fragmentary sectional view illustrating a structural detail of the bearing, and Figure 3 is a chart illustrating the functional effect of the applicant's invention.

The bearing according to Figure 1 comprises an outer ring 1 having an internal spherical raceway 2 common to both rows of rollers 3a and 3b. The inner ring 4 has a raceway, 5a and 5b respectively, for each row of rollers. The profiles of these raceways are arcs of circles closely approximating the radius of the sphere of the outer race. Between these latter raceways the inner ring is provided with a cylindrical surface 6. The rollers 3a and 3b roll on the sphere of the outer ring and on the races of the inner ring. The profiles of the rolling surfaces of the rollers are convex curves closely approximating the shape of the profiles of the sphere and of the raceways on the inner ring. The rolling surfaces of the rollers are symmetrical and the contact centers are therefore located at the middle of the roller, where its diameter is greatest. This position of the rollers is the position of axial equilibrium which they always assume when not subjected to forces from any bearing part, other than the races.

A loose guide ring 7 is located between the rows of rollers and is axially displaceable relatively to the inner ring upon which it is centered through medium of the cylindrical surface 6. The guide ring, in accordance with the invention and as previously indicated, conforms substantially in axial width to the axial space between the rollers of the two rows when the latter have assumed their aforesaid positions of equilibrium as determined solely by the raceways. When the width is exact, the ring fills the space between the rows of rollers without play and without being subjected to thrust forces from the rollers when these are in the aforesaid positions of equilibrium and as long as they occupy their correct positions, i. e., when their axes of rotation intersect the axis of the bearing. The side faces of the guide ring here shown, are spherical zones having their respective centers at the points of intersection of the axes of the rollers with the axis of the bearing. This is illustrated in Figure 2 wherein the lines designated $a$ and $b$ represent the axes of rollers 9 and 10 of the respective rows and the line designated $c$ represents the axis of the bearing, the said points of intersection $d$ and $e$ constituting the centers of the spherical side surfaces $7a$ and $7b$ of the guide ring. The contact between the roller end and the guide ring has a certain extent in the peripheral direction of the bearing, so that within the limits determined by elastic deformation in the contact, the rollers are prevented from assuming a skewed position in which their axes would deviate from the line intersecting the bearing axis. Guiding of rollers by end contact in this manner is considerably more accurate than guiding by means of a cage, because in operation the roller ends contact the ring without clearance and their axes can deviate from a direction normal to the ring surface only by pressing on one or the other side of the contact area. Since cages guide by contacting the sides of the rollers, and must provide clearance for production purposes, they would permit a greater degree of axis deviation. Figure 2 depicts matching spherical surfaces on roller end and ring face, but the invention includes combinations in which the ring face defines a conical surface contacting a spherical or flat roller end. Any such combination provides contact between ring and roller having sufficient peripheral extent to produce good aligning effect.

The bearing according to Figure 1 is provided with a cage, $8a$ and $8b$, for each row of rollers. Extensive tests have consistently shown that the moment of friction in the bearing will be considerably less if the bearing is provided with a guide ring as described than if the guide ring is lacking, if roller cages are provided in both cases.

The guide ring 7 is axially displaceable relatively to the inner ring in order that it may without resistance follow the axial displacement of the rows of rollers when the bearing is subjected to thrust. In this case a certain relative axial displacement takes place between the bearing rings. The rollers must then also be axially displaceable if they are to retain the position of equilibrium in which the points of application of the resultants of the load are located at the middle of the rollers. This is necessary if the distribution of the stress in the contact between roller and ring is always to remain as favorable as possible and the load carrying capacity of the bearing therefore be as great as possible.

The accurate centering of the guide ring on the race ring is to prevent it from assuming an eccentric position and thereby, due to its wedge form, forcibly engage the rollers along part of the periphery of the bearing, leaving play between the guide surface and the roller ends at other parts of the periphery. In such a case the distribution of stresses in some of the rollers would be unfavorably influenced, as would be the guiding of some of the other rollers. This is of the greatest importance both as regards carrying capacity of the bearing and the friction.

The guide ring is positioned with running fit around the inner ring in preference to the corresponding position within the outer ring raceway. The inner ring location allows unlimited axial movement without restraint, whereas the outer raceway location obviously would not. Inner ring location also permits use of a guide ring having a much higher guiding surface because only a ring of relatively thin section could be collapsed sufficiently for insertion in assembly through the bore of the outer ring for subsequent expansion into place on the inner surface of the latter without suffering permanent deformation.

When the bearing is subjected to load during rotation, forces are set up which tend to skew the rollers, since the frictional forces are not, and practically never can be, completely balanced. This moment must be counteracted without permitting the rollers to skew to an undue extent. This cannot be accomplished by guiding the rollers by the cage alone because of the necessary play between the rollers and the roller pockets. On the other hand, the guide ring can take up this moment on condition that the forces which then act upon it do not shift the ring from its exact position with relation to roller ends. Since the guide ring is fitted between the rows of rollers with little or no play, it cannot be axially displaced to any significant extent unless both rows of rollers are axially displaced at the same time. This will be the case when the bearing is subjected to thrust as described above, but in this case the guidance is maintained effectively if the bearing is without play within the limits determined by elastic deformation and the aforesaid play under practical allowable limitation of friction. The thrust forces which are created between the rollers and the guiding ring because of the skewing moment on the rollers of course vary with this moment. The skewing moment depends in its turn on the load on the rollers and its variation during the running of the rollers. In the loaded zone of the bearing the moment is comparatively great and in the unloaded zone it is comparatively small. The forces acting on the guide ring will therefore be of different magnitudes at different parts of the periphery. The guide ring is of necessity substantially wedge-shaped in section wherefore the radial resultants of the forces acting upon the ring from both the rows of rollers will be great along half of the periphery and small along the other half. The guide ring will therefore be subjected to a radial load in the direction in which the radial load of the bearing acts. An effective centering of the guide ring on the race ring is therefore necesary to maintain the roller guiding at full effect.

If the guide ring were free to assume an eccentric position, the rollers in the loaded zone would skew because of the wedge-shaped section of the guide ring while the rollers in the unloaded zone would be forced outwardly from the central plane of the bearing and would be forced by the races to slide back to their positions of equilibrium when they entered the loaded zone. The centering of the guide ring therefore has a great influence on the frictional losses in the bearing as a whole.

A graphic illustration of one functional effect of the invention as applied to a typical bearing of the spherical roller type is given in Figure 3. Specifically this chart shows the effect of guide ring width on the friction torque of the bearing at a given speed of 600 R. P. M. and with various radial loads ranging from 2,000 lbs. to 10,000 lbs. It will be noted that the optimum condition is obtained when the guide ring fits exactly between the rows of rollers without play and in the particular bearing under test the axial width of the guide ring was .268" which corresponded exactly to the space between the rows of rollers when the latter were in the aforesaid positions of equilibrium. From this optimum relation of ring and rollers the friction torque increased both with a reduction in the effective width of the ring and an increase in the effective width. The freedom for skewing afforded by a loose fit between the ring and the roller ends resulted in a sharp increase in friction torque particularly under the higher loads; whereas the forcing of the rollers outwardly from the said positions of equilibrium which resulted from a ring of increased axial width was responsible for a corresponding and even sharper increase in friction torque. In both cases the increase in torque was progressive from the condition of "exact fit."

It is evident that to produce bearings of the character described above with a precise fit of the guide ring between the rows of rollers would involve relatively high costs. It is evident also, in view of the relative flatness of the curves, as shown in Figure 3, at each side of the "exact fit" position, that normal tolerances may be observed without undue increase in average friction torque, the losses in the bearing due to minor increases being more than offset by the gain in manufacturing economy. I have found it preferable, however, for the reasons set forth below, to establish the tolerance range on the "loose fit" side and to an extent precluding guide ring preload pressure against the roller ends (or vice versa).

When the guide ring is of such width that the rollers are displaced from the aforesaid positions of axial equilibrium, with the resultant preload pressures described above, there is an increasing concentration of radial loading toward the ends of the rollers which sets up material stresses having a pronounced adverse effect upon the useful life of the bearing. To avoid this effect, is is necessary to form the rollers so that the radius of their lengthwise profiles is substantially smaller than the radius of the spherical raceway, in the range for example of from 94% to 97% of the sphere radius. Such roller contours, while effectively avoiding the destructive concentrations of stresses on the ends of the rollers, also considerably restrict bearing capacity. By dimensioning the guide ring so that there is no preload pressure between the ring and the rollers i. e. so that either the "exact fit" or a positive clearance condition prevails, therefore, the roller profile can safely be made to conform much more closely to the spherical race surface, with resultant material capacity gain. The radius of the roller profile may, for example, be from 98% to 99.5% of the spherical race surface, and within this range will afford increased bearing capacities of from 25% to 50%, or more, as compared with bearings wherein the guide ring and rollers are subject to the preload pressure condition described above.

I have found that within certain limits, the loss in capacity which accompanies the said preload condition more than offsets the advantages of the reduced friction torque obtainable by close fitting of the guide ring to the space between the rows of rollers as described above, and that an optimum condition of combined capacity, durability and economy can be obtained by constructing the bearing so that a limited positive clearance exists between the guide ring and the roller ends when the rollers are in the aforesaid positions of axial equilibrium. In order to take full advantage of normal tolerances and to avoid necessity for unusual precision in manufacture, I prefer to establish a low limit of permissible clearance at the "exact fit" relation, i. e.+.000 inch, and a high limit of say + .008 inch per inch of roller diameter. This designated clearance of .008 inch per inch of roller diameter with a tolerance of .003 inch per inch of roller diameter either way affords maximum capacity, a reduced and highly acceptable friction torque, and a highly economical cost basis for manufacture by avoidance of abnormal precision requirement.

The accurately dimensioned guide ring also provides a means of supporting the cages for riding of their outboard edges on the inner raceways and also at their inboard edges on the guide ring. For this purpose, I machine the surfaces 9 of the cage which contact the guide ring, so as to assure accurate positioning of cage for precision contact with rollers. The contact with the guide ring will always cover a greater surface than the contact with the raceway, so that there will be less intensity of pressure and thereby less wear at the guide ring than at the raceway.

Metallic rubbing against the raceway carries the inherent risk of causing localized cracks in the hardened steel thereof, which have, sometimes, penetrated deeply enough to break pieces out of the inner ring. A metal may be used for the guide ring, for example cast iron, which will not crack because of rubbing friction. While I prefer to rest the cages on both guide ring and raceway, the use of the guide ring for major support enables me to eliminate raceway support for high speed operation.

This application is a continuation-in-part of an application Serial Number 60,945 of the same inventor filed November 19, 1948, and now abandoned.

I claim:

1. A spherical roller bearing having two rows of rollers with convexly curved rolling surfaces symmetrical with respect to the central cross-sectional plane of the rollers, an outer race ring having a concave spherical raceway common to both of said rows of rollers, an inner race ring having a raceway for each of said rows of rollers, said raceways having concavely curved profiles, and a guide ring for guiding the rollers, there being a cylindrical surface on the inner race ring between the said inner raceways, said guide ring being centered on said cylindrical surface and axially slidable thereon and being of such width that it substantially conforms dimensionally to the space between the two rows of rollers and is substantially free from thrust forces from the rollers when the rollers assume their axial positions of equilibrium as determined solely by the raceways of the rings, and in which positions the axes of the rollers intersect the axis of the bearing.

2. A spherical roller bearing according to claim 1 wherein the axial end surfaces of the guide ring and the confronting surfaces of the roller ends are relatively formed to afford an area of guiding contact extended circumferentially of the ring at each side of the geometrical center of the roller end.

3. A spherical roller bearing according to claim 2 wherein the cross-sectional profiles of the several raceways and axial profile of the rolling surfaces of the rollers are approximately the same.

4. A spherical roller bearing according to claim 2 wherein the radius of the longitudinal profile of the rolling surfaces of the rollers is from 98% to 99.5% of the radius of the cross-sectional profiles of the several raceways.

5. A spherical roller bearing having two rows of rollers with convexly curved rolling surfaces symmetrical with respect to the central cross-sectional plane of the rollers, an outer race ring having a concave spherical raceway common to both of said rows of rollers, an inner race ring having a raceway for each of said rows of rollers, said raceways having concavely curved profiles and a guide ring for guiding the rollers, there being a cylindrical surface on the inner race ring between the said inner raceways, said guide ring being centered on said cylindrical surface and axially slidable thereon and being of such width that a positive clearance of from .000 to .008 of an inch per inch of roller diameter exists between the axial end faces of the guide ring and the confronting faces of the rollers when the rollers assume their axial positions of equilibrium as determined solely by the raceways of the rings, and in which positions the axes of the rollers intersect the axis of the bearing.

References Cited in the file of this patent

UNITED STATES PATENTS

| 1,866,936 | Kifer | July 12, 1932 |
| 2,387,962 | Williams | Oct. 30, 1945 |

FOREIGN PATENTS

| 644,181 | Germany | Apr. 26, 1937 |
| 727,842 | France | June 24, 1932 |